Sept. 1, 1925.
A. M. BARRETT
1,551,630
LIFTING TRUCK
Original Filed Dec. 21, 1917    2 Sheets-Sheet 1
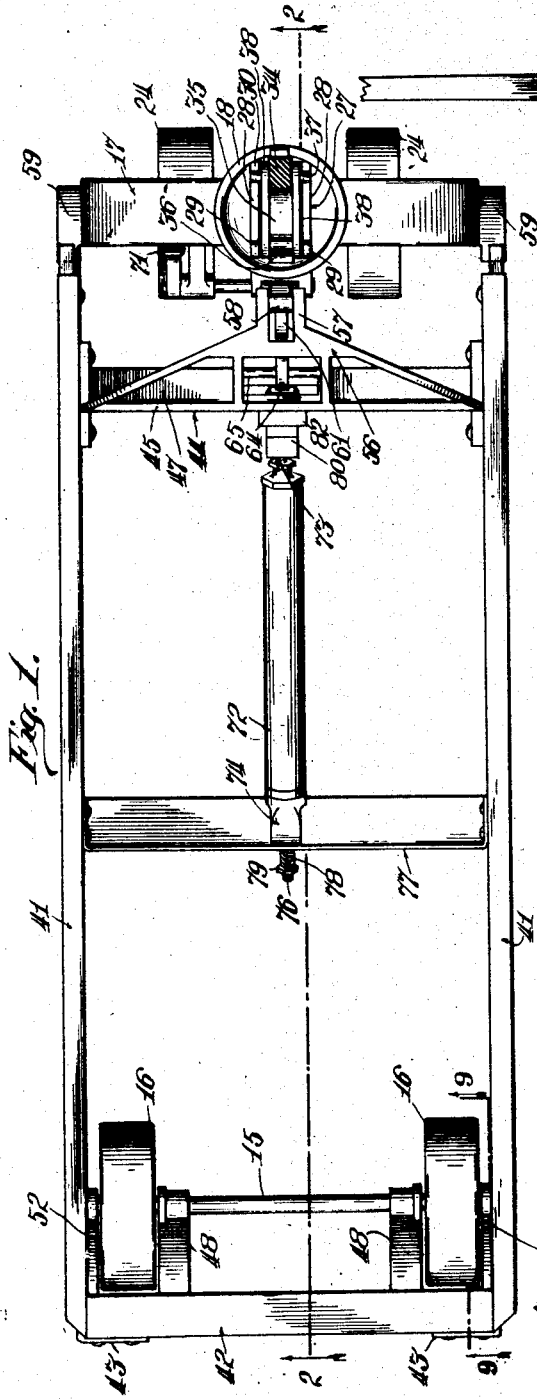

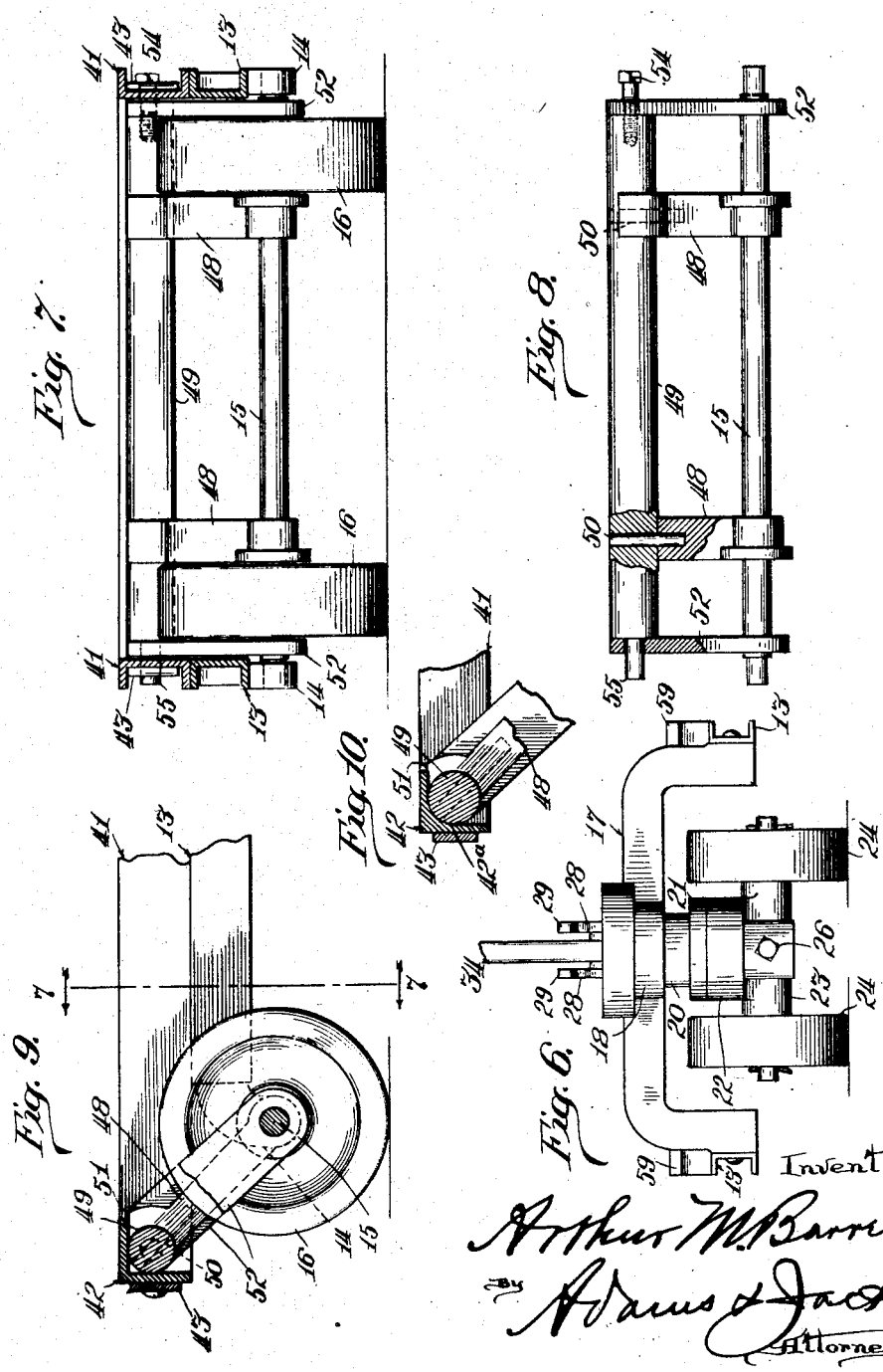

Patented Sept. 1, 1925.

1,551,630

UNITED STATES PATENT OFFICE.

ARTHUR M. BARRETT, OF WINNETKA, ILLINOIS.

LIFTING TRUCK.

Original application filed December 21, 1917, Serial No. 208,280. Divided and this application filed April 26, 1922. Serial No. 556,741.

*To all whom it may concern:*

Be it known that I, ARTHUR M. BARRETT, a citizen of the United States, residing at Winnetka, in the county of Cook and State of Illinois, have invented certain new and useful Improvements in Lifting Trucks, of which the following is a specification, reference being had to the accompanying drawings.

My invention relates to lifting trucks, or trucks comprising a rising and falling frame adapted to be introduced under a suitable platform or table on which a load is placed, and to be elevated to lift the platform and load so that it can be transported by means of the truck. Such trucks ordinarily consist of a main frame, rectangular in outline, which is supported on front and rear wheels, the front wheel or wheels being capable of being turned for steering purposes by means of a handle or lever, said lever being also employed for the purpose of raising and lowering the elevating frame. The latter frame conforms generally in outline to the shape of the main frame, and is supported by it in such manner that when moved longitudinally in one direction it will rise, and when moved in the opposite direction it will descend. A truck of this general character is shown in my patent, No. 1,308,750, dated July 8, 1919. The object of my present invention is to provide certain improvements in trucks of the type referred to, and particularly to provide improved means for mounting the rear end portion of the elevating frame so as to provide a better support therefor and reduce wear on the moving parts; and to provide improved means for checking the descent of the elevating frame when it is being lowered. I accomplish my object as illustrated in the accompanying drawings and as hereinafter described. What I regard as new is set forth in the claims.

In the accompanying drawings:

Fig. 1 is a plan view of my improved truck, the operating lever being in section;

Fig. 2 is substantially a longitudinal section on line 2—2 of Fig. 1;

Fig. 3 is a detail, being a central longitudinal sectional view of the rear coupling of the fluid check on line 3—3 of Fig. 4;

Fig. 4 is an elevation of the forward end of said coupling;

Fig. 5 is an under side view of said coupling;

Fig. 6 is a front elevation of the truck, part of the operating lever being omitted;

Fig. 7 is a transverse section on line 7—7 of Fig. 9;

Fig. 8 is an elevation of the rear axle and the connections by which the rear end of the elevating frame is supported, certain parts being shown in section;

Fig. 9 is an enlarged detail, being a partial longitudinal section on line 9—9 of Fig. 1; and Fig. 10 is a similar longitudinal sectional view showing a modification.

Referring to the drawings;

13 indicates the side bars of the main frame of the truck, which as best shown in Fig. 6 are preferably made of channel iron. At their rear ends said bars are preferably curved downward, and in said downwardly-extending ends 14 are mounted the ends of the rear axle 15. 16 indicates the rear wheels which are mounted on the axle 15 near the side bars 13, as shown in Figs. 1 and 7.

The side bars 13 are connected at their front ends by an inverted U-shaped cross-head 17, as best shown in Fig. 6. As illustrated in Fig. 2, said cross-head is provided centrally at its upper side with a circular cup 18, the upper portion of which is offset to provide an internal ledge or shoulder 19. Co-axially disposed with reference to the cup 18 and extending downward therefrom is a cylindrical bearing or sleeve 20 having a peripheral flange 21 disposed intermediately thereof, as shown in Fig. 2. The lower end of said sleeve is adapted to fit into a socket in the upper end of a co-acting bearing block 22 provided at the upper side of the front axle 23, on the ends of which the front wheels 24 are mounted, as shown in Fig. 6. The sleeve 20 co-operates with the bearing block 22 to pivotally support the front axle so that the front wheels may be adjusted angularly as required in steering the truck. By this construction I provide extending bearing surfaces between these parts, since the upper margin of the bearing block 22 bears against the lower surface of the flange 21, and the lower end of the sleeve 20 bears against the bottom of the socket in said bearing block, while the periphery of said sleeve bears against the inner surface thereof. The bearing block 22 is held in place and is turned for steering purposes by means of a pivot, or king bolt 25, which extends down through the sleeve 20 and the bearing block 22, and is non-rotatably connected with said block by a bolt 26, shown in Fig. 2, or other suitable means. At its upper end the king bolt 25 carries a head 27 which rests on the bottom of the cup 18. Said head is provided with two upwardly projecting parallel brackets 28, the shape of which is best shown in Figs. 1 and 2. As there illustrated, said brackets are segmental in shape and are provided with projecting fingers 29—30 at their ends between which fingers the outer edges of the brackets are curved, as shown at 31. Adjacent to the fingers 30 the brackets 28 are connected by a transverse web 32, V-shaped in cross section, and adjacent to the fingers 29 they are connected by a cross-bar 33 which rests on the shoulder 19 and bears thereon as the king bolt 25 is turned in one direction or the other.

34 indicates the operating lever or handle which is substantially a bellcrank lever, being provided at its lower end with an arm 35 which is approximately at right angles to the main portion of said lever, as shown in Fig. 2. The arm 35 is provided with a hook 36 which is adapted to engage a portion of the elevating frame for raising and lowering the same, as will be hereinafter described. The lower end of the lever 34 is mounted between the brackets 28 on a pivot 37 which is adapted to ride on the curved outer edges 31 of said brackets to permit the lever 34 to be shifted into either of two positions, one of which it occupies when used to raise or lower the elevating frame, and the other of which it occupies when used for moving the truck from place to place and steering it. The lever 34 is connected with the head 27 and is held in operative relation to the brackets 28 by a pair of links 38 disposed between said brackets and the opposite sides of the lever, and connected with the pivot 37 and with another pivot 39 mounted between said brackets, as shown in Figs. 1 and 2.

It will be apparent from the foregoing description that by swinging the lever 34 laterally, the king bolt 25 may be rotated in one direction or the other, correspondingly turning the front wheels so that the truck may be steered. When this occurs, the head 27 turns in the cup 18, the bar 33 riding on the shoulder 19. The engagement of said bar with said shoulder is advantageous because it provides a firm support for the ends of the brackets 28 when the lever 34 is used to raise and lower the load, and it also aids in supporting said brackets when the truck is steered. When not in use the lever 34 may be supported in a substantially upright position so that it will be out of the way by moving its fulcrum 37 to its extreme forward position, which will permit the lever arm 35 to rest on the pivot 39. When in such position, the hook 36 moves down in front of the cross-bar 33.

41 indicates the side bars of the elevating frame which are preferably channel bars, as shown in Fig. 7, and are disposed so that they overlie the side bars 13 of the main frame. The side bars 41 are connected at their rear ends by a cross-bar 42 presenting angularly disposed sections which also serves as a bearing, as will be hereinafter described. Said cross-bar may be made of either a simple angle iron, as shown in Fig. 9, or it may be an angular bar having its inner side rounded, as shown at 42ª in Fig. 10. In the construction shown, the cross-bar 42 is connected with the side bars 41 by straps 43, but it may be connected therewith in any other suitable way, as by welding. 44 indicates a front cross-bar which is preferably T-shaped in cross-section, being provided with vertical flanges 45—46 and a horizontal flange 47, shown in Fig. 2. This front cross-bar is fixedly connected with the side bars 41 near their forward ends and serves to brace said bars as well as to perform various other functions, as will hereinafter appear. 48 indicates links or struts which are mounted upon the rear axle 15 between the wheels 16, as shown in Fig. 7, and support at their upper ends a cylindrical bearing member 49, which, in the construction shown, is non-rotatably secured thereto by pins 50, as illustrated in Fig. 8. Said cylindrical member may, however, be formed integral with the links 48 or be otherwise operatively connected therewith. Said cylindrical member 49 is of suitable diameter to fit into the angle of the cross-bar 42 so as to bear against the horizontal and vertical flanges thereof, as shown in Fig. 9, or against the inner curved surface thereof, if said cross-bar be made as shown in Fig. 10, so that when the links 48 are swung forward about the rear axle 15 as a pivot, the co-acting surfaces of the cylindrical member 49 and the cross-bar 42 or 42ª, provide an extended bearing between said members, thereby not only reducing wear, but also furnishing a more stable support for the rear end of the elevating frame. In the construction illustrated the member 49 is shown as a true cylinder as that construction is preferable, but it will be understood that instead of a true cylinder any other rounded bearing surface of suitable contour to perform the required function may be employed, and the term "cylindrical" is to be construed accordingly. In order to permit the links 48 to assume the necessary inclined position when the elevating frame is lowered, said links are flattened as shown at 51 in Fig. 9, this flattened portion being adapted to underlie and bear against the under surface of the horizontal web of the cross-bar 42 when the elevating frame is down, so that said links serve as stops to limit the downward movement of the elevating frame and also aid in supporting it when it is in its lowered position. In addition to the links 48, the cylindrical bearing member 49 is connected to the rear axle 15 by links 52 which are fitted upon the ends of the axle 15 outside of the rear wheels, as shown in Fig. 9. Preferably one of the links 52 is connected with one end of the member 49 by a bolt 54 passed through the adjacent side bar 41 and screwed into the end of the member 49, as indicated by dotted lines in Fig. 8, and the other link 52 is secured to the opposite end of said member 49 by fitting it upon a pin 55 which projects from that end of said member 49 and into a suitable socket in the opposite side bar 41, as shown in Figs. 7 and 8.

56 indicates a bracket carried by the side bars 41 near their forward ends, and preferably cast integral with the cross-bar 44. Said bracket is substantially V-shaped, its apex extending upward and forward and being provided with a yoke 57 in which is mounted a cross-pin 58 which is adapted to be in alinement with the hook 36 of the operating lever 34 when said lever is in its central or neutral position, at which time, the front wheels are disposed parallel with the rear wheels, as illustrated in Fig. 1. The arrangement of these parts is such that when the elevating frame is in its lowered position, by moving the pivot 37 of the operating lever 34 to its rearmost position on the brackets 28 and swinging said lever upward to a substantially vertical position, as illustrated in Fig. 2, the hook 36 may be brought into engagement with the pin 58. By then swinging the lever downward, it will operate to lift the elevating frame and pull it forward. The links 38 will then assume a rearwardly inclined position, the fulcrum 37 lying back of the pivot 39 and the pin 58 being approximately vertically above the fulcrum 37, so that the weight of the elevating frame when it is being lifted as well as when it is approximately in its raised position, tends to hold the fulcrum of the operating lever in its lifting position, but it may readily be swung forward on the brackets 28 after the hook 36 has been disengaged from the pin 58. The elevating frame is caused to rise when the lever 34 is operated in the manner described, by the swinging of the links 48 and 52 in a clockwise direction about the rear axle 15 as an axis and the swinging of the lever arm 35 about the fulcrum 37. For supporting and guiding the front end of said frame when it is lowered without using the lever 34, inclined planes 59 are provided at the sides of the cross head 17 in position to be engaged by the forward ends of the side bars 41 of the elevating frame, which are preferably bevelled. Thus when the locking devices, hereinafter described, by which the elevating frame is held in its raised position are released, the rear end of said frame is lowered by the swinging of the links 48 while its forward end slides down the inclined guides 59, so that said frame maintains approximately a substantially horizontal position as it rises or descends.

The elevating frame is secured in its elevated position by means of a latch 61 which is loosely mounted upon a transverse shaft 62 arranged in suitable bearings back of the head 18, as shown in Fig. 2. Said latch is located in about the center line of the truck and extends rearwardly from said shaft. On its under side, it is provided with a bevelled tooth $62^a$ which is adapted to engage a bevelled block 63 which, in the construction shown, is carried by the horizontal flange 47 in such position that when the elevating frame is in its uppermost position, the tooth $62^a$ will engage the block 63 and lie between it and the vertical flange 45. It will be apparent that inasmuch as the elevating frame 41 cannot descend without moving rearwardly, if the latch 61 be held down in operative relation to the block 63, the elevating frame will be locked in its raised position. For the purpose of holding said latch down in operative position, a swinging dog 64 is provided, which is suspended from a suitable pivot 65, so that when the elevating frame is in its raised position, it will overlie the upper side of the latch 61 and be adapted to engage an upwardly projecting lug 66 provided at the upper side of said latch, shown in Fig. 2. The arrangement is such that when the dog 64 is in the latter position its lower end will engage the lug 66 and hold the latch down in operative position, but by swinging the dog 64 rearwardly far enough to clear the latch 61 the latch will be free to swing upward and permit the elevating frame to descend. The latch 61 is normally held in a substantially horizontal position by a shoulder 67 which projects forward from the shaft 62 and is adapted to engage the head 18, or some other fixed part, when the latch 61 is in approximately a horizontal position. The face of said shoulder is slightly bevelled to permit the latch to swing upward to a limited extent. The dog 64 preferably maintains its operative position shown in Fig. 2 by gravity, and to limit its forward movement it is provided with a lug 68 which is adapted to engage a part of the bracket 56 when said dog occupies its vertical position. Said dog is swung rearwardly for the purpose of releasing the latch 61, by means of an arm 69 which is mounted on and secured to the shaft 62 in position to engage a forwardly projecting lug 70 carried by the dog 64, as shown in Fig. 2. By rocking the shaft 62 to move the arm 69 in a counterclockwise direction, it will engage the lug 70 and move the dog 64 away from over the latch 61, as will readily be understood. The shaft 62 is rocked by means of a foot lever 71, shown in Fig. 1, which is normally held in it forward position by gravity, but if desired a spring may be used for that purpose.

When the elevating frame is in its lowered position shown in Fig. 2, the dog 64 does not overlie the latch 61, but as said frame is lifted it moves forward as has been described, until, when the elevating frame reaches its highest position, said dog is carried over said latch into operative position. Before said dog reaches its operative position, however, the forward bevelled edge of the block 63 engages the rearward bevelled edge of the tooth 62ª and lifts the latch 61 sufficiently to permit it to ride over the block 63 and drop into the space between said block and the flange 45. The dog 64 then swings over the latch 61 and locks the elevating frame in its raised position.

In order to check the descent of the elevating frame when loaded, I provide a check 72 interposed between said elevating frame and the main frame. Said check comprises a cylinder in which operates a piston having a piston rod 73, which is drawn out by the elevation of the elevating frame and is forced back into the cylinder by the descent of said frame. The interior construction of the check has nothing to do with my present invention further than that it should be a fluid check of any approved type, and preferably provided with a spring to start the descent of the elevating frame when it is not loaded. Such checks are well known in the art, and have for many years been used in connection with doors, and, therefore, the interior construction of the check need not be described, but I provide an improved mounting for the check which enables it to accommodate itself to the peculiar movement of the elevating frame without undue wear, as will now be described.

74 indicates a coupling which is provided at the rear end of the check, and is preferably secured thereto by screwing it into the rear end of the cylinder of the check, as shown in Fig. 5. Said coupling is provided with a slot 75 at its under side which is adapted to receive the head and the adjacent portion of a bolt 76, and it is also provided with a recess 76ª into which the head of the bolt may fit, as shown in dotted lines in Figs. 2 and 4. Said bolt passes through a suitable opening in a cross-brace 77 which connects the side members 13 of the main frame, and is preferably located about midway of the length of the main frame, as shown in Fig. 2. The brace 77 is preferably of angle iron, and the outer portion of the coupling 74 is rounded so that it bears peripherally against the vertical flange of said brace and is adapted to rock thereon. A spring 78 is mounted on the bolt 76 at the opposite side of said vertical flange, and between said flange and a nut 79 screwed upon the rear end of said bolt. Thus the coupling 74 is yieldingly held with a rocking bearing against the brace 77, and any wear is taken up by the action of the spring 78. The forward end of the piston rod 73 is connected to another coupling 80, having a rounded head 81 which fits in a socket in a bearing block 82 which is secured to the flange 46 in any suitable way. I thus provide a peripheral rocking bearing for supporting the forward end of the piston rod. The coupling 80 is provided with a depending lug 83, and a bolt 84 passes through said lug and through the flange 46, said bolt carrying a spring 85 which bears against the lug 83 and a nut 86 mounted on the rear end of the bolt 84, so that said spring exerts a yielding forward pressure on the lug 83 which tends to swing the coupling 80 in a counterclockwise direction. The coupling 80, therefore, accommodates itself to the changing angle of the check resulting from the rising and falling of the elevating frame, and consequently not only reduces the wear on the forward connection of the piston rod, but also maintains the piston rod in proper alinement with the cylinder of the check, thereby avoiding excessive wear on the stuffing-box at the forward end of said cylinder.

The devices for raising the elevating frame and for locking it in its elevated position, and the construction by which the steering wheels are mounted, are not claimed herein as they form the subject-matter of my Patent No. 1,459,044, dated June 19, 1923, of which this application is a division.

While I have shown and described my improvements as applied to a truck in which the elevating frame moves longitudinally when it is moved vertically I wish it to be understood that in so far as they are applicable to trucks in which the elevating frame moves vertically only the claims are to be construed accordingly.

What I claim as my invention and desire to secure by Letters Patent, is—

1. A lifting truck comprising a main frame, an elevating frame having transverse bearing surfaces disposed angularly relatively to each other, and swinging means supported by the main frame and arranged to bear on said bearing surfaces, for raising or lowering said elevating frame.

2. A lifting truck comprising a main frame, an elevating frame having transverse bearing surfaces, disposed angularly relatively to each other, and swinging links pivotally supported by the main frame and having a bearing member adapted to bear on said bearing surfaces, for raising or lowering said elevating frame.

3. A lifting truck comprising a main frame, an elevating frame having transverse angularly-disposed bearing surfaces, swinging links pivotally supported at opposite sides of the main frame, and a transversely-disposed bearing member carried by said links and bearing on said bearing surfaces, for raising or lowering said elevating frame.

4. A lifting truck comprising a main frame, an elevating frame having transverse, angularly-disposed bearing surfaces, swinging links pivotally supported by the main frame, and a cylindrical bearing member connected with said links and bearing on said bearing surfaces.

5. A lifting truck comprising a main frame, an elevating frame having a transversely disposed angle bar, links pivotally supported by the main frame, and a cylindrical bearing member carried by said links and bearing in the angle of said bar.

6. A lifting truck comprising a main frame, an elevating frame having a transversely disposed angle bar, links pivotally supported by the main frame, said links having flattened portions adapted to underlie a flange of said angle bar when said elevating frame is in its lowered position, and a cylindrical bearing member carried by said links and bearing against said angle bar.

7. A lifting truck comprising a main frame, an axle connected therewith, wheels mounted on said axle, an elevating frame having a transversely disposed angle bar, links mounted on said axle, and a transversely arranged bearing member connected with said links and bearing in the angle of said bar.

8. A lifting truck comprising a main frame, an elevating frame having a transversely disposed angle bar adjacent to one end thereof, links pivotally supported by the main frame, a cylindrical bearing member carried by said links and bearing in the angle of said bar, and means supported by said main frame and cooperating with the other end portion of said elevating frame for raising said elevating frame.

9. A lifting truck comprising a main frame, an elevating frame having a transversely disposed angle bar adjacent to one end thereof, links pivotally supported by the main frame, said links having flattened portions adapted to underlie a flange of said angle bar when said elevating frame is in its lowered position, a cylindrical bearing member carried by said links and bearing against said angle bar, and means supported by said main frame and cooperating with the other end portion of said elevating frame for raising said elevating frame.

10. In an elevating truck comprising load supporting means having a transverse member presenting angularly disposed sections, means for elevating said load supporting means including a strut pivotally supported at its lower end and having a bearing at its upper end engaging said angularly disposed sections and lying within the angle formed by the angularly disposed sections of said transverse member.

11. In an elevating truck comprising a wheel supported main frame, a platform comprising a front end bar and a rear end bar formed of angle iron presenting a horizontal top section and a vertical rear section, side plates connecting said front and rear end bars, and means for elevating said platform relatively to said frame including a strut pivotally mounted upon said main frame and having bearing members lying within the angle formed by the vertical and horizontal sections of said rear end bar.

12. A lifting truck comprising a main frame, an elevating frame, a check adapted to retard the downward movement of said elevating frame, said check having a yielding rocking connection with each of said frames, and means mounted on said main frame for raising said elevating frame.

13. A lifting truck comprising a main frame, an elevating frame arranged to move longitudinally when it is moved vertically, a check adapted to retard the downward movement of said elevating frame, said check having a yielding rocking connection with each of said frames, and means mounted on said main frame for raising said elevating frame and moving it longitudinally.

14. In a lifting truck, the combination with a main frame and an elevating frame, of a check connected with said frames and adapted to retard the downward movement of said elevating frame, said check comprising a rounded end having a rocking bearing on a portion of one of said frames, and means mounted on said main frame for raising said elevating frame.

15. In a lifting truck, the combination with a main frame and an elevating frame arranged to move longitudinally when it is moved vertically, of a check connected with said frames and adapted to retard the downward movement of said elevating frame, said check comprising a rounded end having a rocking bearing on a portion of one of said frames, and means mounted on said main frame for raising said elevating frame and moving it longitudinally.

16. In a lifting truck, the combination with a main frame and an elevating frame, of a check connected with said frames and adapted to retard the downward movement of said elevating frame, said check comprising a rounded end having a rocking bearing on said main frame, means connecting said rounded end with the latter frame, and means mounted on said main frame for raising said elevating frame.

17. In a lifting truck, the combination with a main frame and an elevating frame arranged to move longitudinally when it is moved vertically, of a check connected with said frames and adapted to retard the downward movement of said elevating frame, said check comprising a rounded end having a rocking bearing on said main frame, means connecting said rounded end with the latter frame, and means mounted on said main frame for raising said elevating frame and moving it longitudinally.

18. In a lifting truck, the combination with a main frame and an elevating frame, of a check connected with said frames and adapted to retard the downward movement of said elevating frame, said check comprising a rounded end having a rocking bearing on said main frame, means yieldingly connecting said rounded end with the latter frame, and means mounted on said main frame for raising said elevating frame.

19. In a lifting truck, the combination with a main frame and an elevating frame, of a check adapted to retard the downward movement of said elevating frame, said check comprising peripheral rocker bearings seated against said main and elevating frames, respectively, and means mounted on said main frame for raising said elevating frame.

20. In a lifting truck, the combination with a main frame and an elevating frame, of a check adapted to retard the downward movement of said elevating frame, said check comprising peripheral rocker bearings seated against said main and elevating frames, respectively, and means mounted on said main frame for raising said elevating frame.

21. In a lifting truck, the combination with a main frame and an elevating frame, of a check adapted to retard the downward movement of said elevating frame, said check comprising end rocker bearings seated against said main and elevating frames, respectively, means yieldingly connecting the ends of said check with said frames, and means mounted on said main frame for raising said elevating frame.

22. In a lifting truck, the combination with a main frame and an elevating frame, of a check for retarding the downward movement of said elevating frame, said check comprising a rounded end having a rocker bearing on a portion of one of said frames, a bolt connecting the rounded end with the latter frame, a spring on said bolt for yieldingly holding said rocker bearing on its seat, and means mounted on said main frame for raising said elevating frame.

23. In a lifting truck, the combination with a main frame and an elevating frame, of a check for retarding the downward movement of said elevating frame, said check comprising a piston rod having a rocker bearing on one of said frames, and means mounted on said main frame for raising said elevating frame.

24. In a lifting truck, the combination with a main frame and an elevating frame, of a check for retarding the downward movement of said elevating frame, said check comprising a piston rod having a rocker bearing on said elevating frame, and means mounted on said main frame for raising said elevating frame.

25. In a lifting truck, the combination with a main frame and an elevating frame, of a check for retarding the downward movement of said elevating frame, said check comprising a piston rod having a rounded head adapted to bear against one of said frames, means for connecting said piston rod to such frame, and means mounted on said main frame for raising said elevating frame.

26. In a lifting truck, the combination with a main frame and an elevating frame, of a check for retarding the downward movement of said elevating frame, said check comprising a piston rod having a rounded head adapted to bear against one of said frames, means for yieldingly connecting said piston rod to such frame, and means mounted on said main frame for raising said elevating frame.

27. In a lifting truck, the combination with a main frame and an elevating frame, of a check for retarding the downward movement of said elevating frame, said check having a rounded end adapted to rock on the main frame and comprising a piston rod having a rocker bearing on said elevating frame, means for holding the members of said check in operative relation to said main and elevating frames, and means mounted on said main frame for raising said elevating frame.

ARTHUR M. BARRETT.